Aug. 24, 1954     S. C. VAHEY     2,687,326
AIR DUCT FOR AUTOMOBILES

Filed Nov. 13, 1950     2 Sheets-Sheet 1

INVENTOR.
Stanley C. Vahey
BY
Maurice A. Crews
ATTORNEY

Aug. 24, 1954 — S. C. VAHEY — 2,687,326
AIR DUCT FOR AUTOMOBILES
Filed Nov. 13, 1950 — 2 Sheets-Sheet 2

INVENTOR.
Stanley C. Vahey.
BY Maurice A. Crews
ATTORNEY

Patented Aug. 24, 1954

2,687,326

UNITED STATES PATENT OFFICE 2,687,326

AIR DUCT FOR AUTOMOBILES

Stanley C. Vahey, Detroit, Mich., assignor to The Budd Company, Philadelphia, Pa., a corporation of Pennsylvania Application November 13, 1950, Serial No. 195,268

8 Claims. (Cl. 296—28)

1

The invention relates to improvements in air ducts for automobile bodies, particularly bodies of the frameless or self-supporting type in which body and chassis are combined into one integral structure.

Among the objects of the invention is the formation of an air duct for automobile bodies which is simple in design and which requires a minimum of space.

These and other objects and advantages are achieved mainly by the novel formation of a brace of the body structure proper as air duct.

One embodiment of the invention is illustrated in the attached drawing in which, Figure 1 is a fragmentary three-quarter front perspective and longitudinal middle section of the front end of a combined chassis and body structure;

Figure 1:
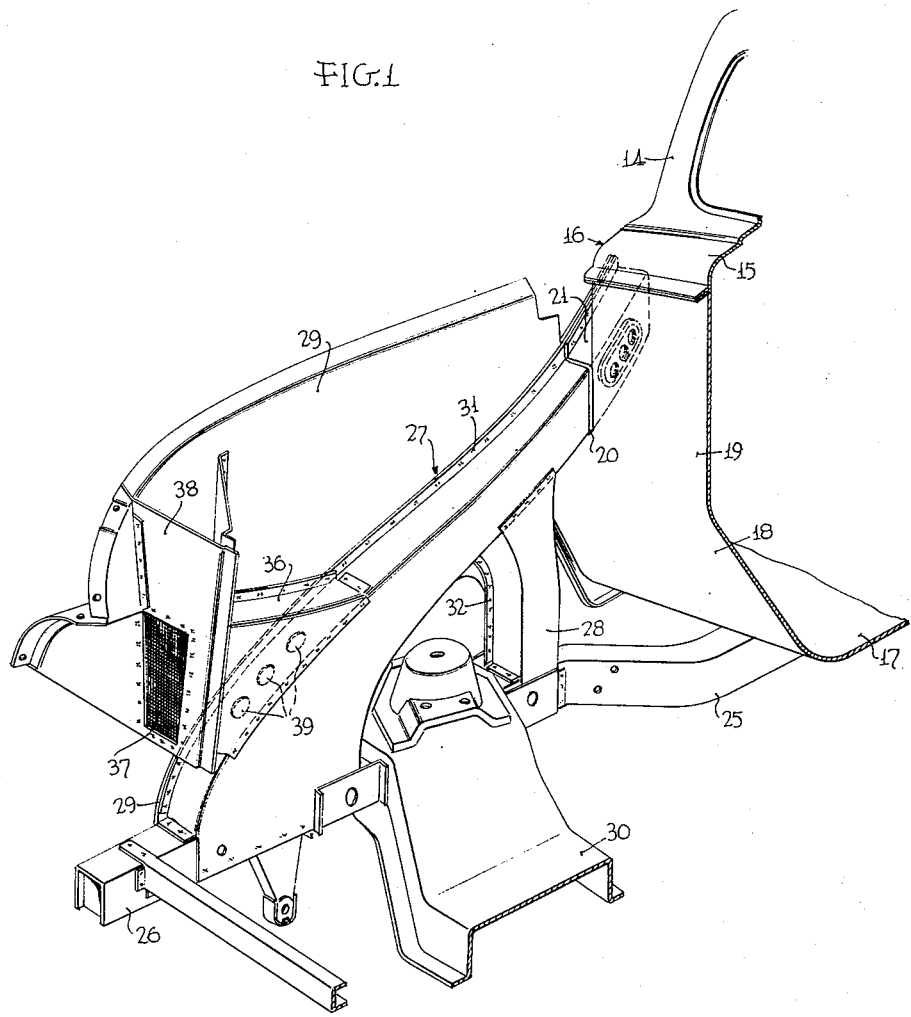
Figure 2:
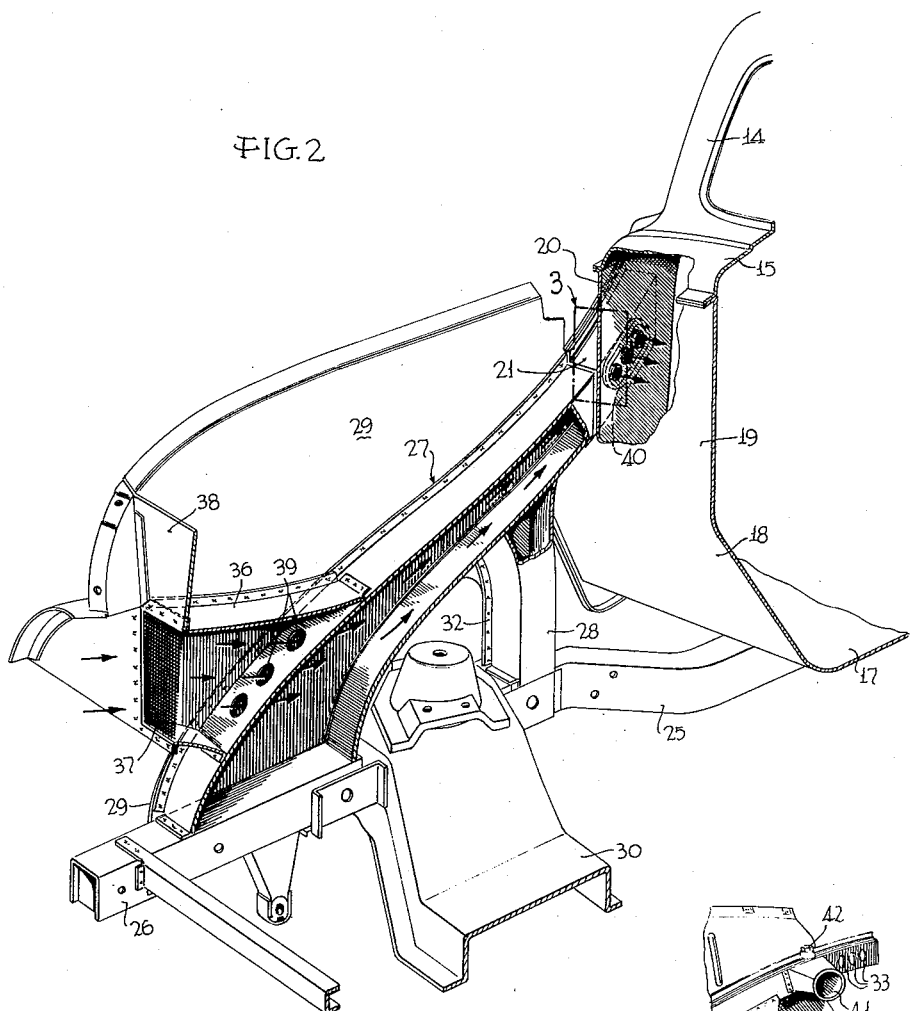
Figure 2 is a similar perspective showing the body per Figure 1, certain parts of the air duct being broken away to reveal its interior construction.
Figure 3:
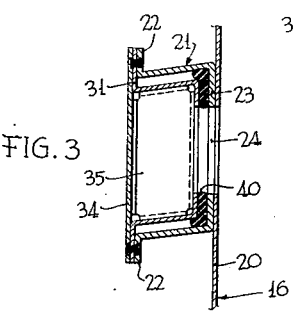
Figure 3 is a fragmentary section on a larger scale in the plane of line 3 of Figure 2, illustrating the connection between the main body unit and the inclined brace forming the air duct.
Figure 4:
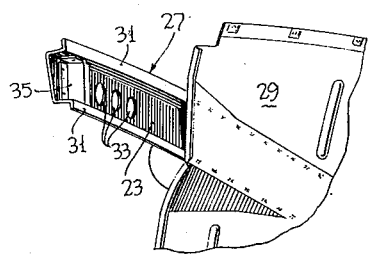
Figure 4 is a fragmentary outside view of the upper, rear end of the brace without cover plate and of an adjoining part of the wheel housing.

It will be understood that Figures 1 and 2 show one side only of the body and that the other side is substantially symmetrical with respect to the longitudinal vertical middle plane of the body.

The front end of the body, fragmentarily shown in the drawing, comprises front post 14, cowl top 15, cowl side 16, floor panel 17, toeboard 18, and dashboard 19. The upper portion of the cowl side 16 is offset toward the longitudinal middle plane of the body. The offset portion 20 has secured to its outside an outwardly facing channel section 21 provided with marginal flanges 22. Bottom wall 23 of section 21 and wall 20 behind it are provided with large registering openings 24.

A forward body extension comprises a longitudinal sill structure 25, a sill extension 26, an outwardly and rearwardly inclined brace 27 emanating from extension 26, a vertical brace 28 interconnecting sill 25 and brace 27, and an inner wheel housing wall 29 structurally secured to and forming part of said sill and braces 25 to 28.

2

A recess between members 25, 26, 27, and 28, and a cut-out in wheel housing 29 serve for the reception of a transverse wheel-supporting beam 30, features which are more fully disclosed in copending application, Serial No. 133,353, "Cross Beam Attachment for Automobiles," of Alexander R. Lindsay, now Patent 2,636,774 issued April 28, 1953.

Rear margin of wheel housing 29 is secured to toe- and dashboards 18, 19. Side sill member 25 extends rearwardly beyond wheel housing 29 and is secured to the underside of floor panel 16. The details of these connections are not illustrated; they may be substantially the same as disclosed in copending application, Serial No. 166,889, filed June 8, 1950, Alexander R. Lindsay, "Final Connection Between Pre-Assembled Units of Self-Supporting Automobile Bodies," now Patent 2,662,794 issued December 15, 1953.

Braces 27 and 28 are formed as outwardly facing sheet metal hat sections secured, e. g. welded, by their marginal flanges 31, 32 to the inside of sheet metal wheel housing 29. Brace 27 projects rearwardly beyond wheel housing 29 and is arranged and shaped so as to fit in final assembly into the channel section 21 provided on the cowl side 16. The rearwardly extending portion of brace 27 has its bottom wall provided with openings 33, is closed on the outside by a metal strip 34 overlappingly secured to flanges 31 of brace 27, and is closed at the rearward end by insert 35.

In final assembly the wheel housing 29 and sill 25 are connected with the main body unit, forming a compartment for the occupants, as disclosed in aforesaid Patent 2,662,794, that is, a connection which can be made without reaching into the interior of the car. The final connection between the braces 27 and the main body unit likewise does not require reaching into the interior of the car. This connection is made by overlappingly securing the flanges 31 of the brace 27 with flanges 22 of section 21, as disclosed in an application Serial No. 195,264, "Automobile Body, Particularly of the Combined Body and Chassis Type," of Alexander R. Lindsay, filed simultaneously with the present application on November 13, 1950.

All of the aforesaid patents and applications are owned by the assignee of the present application.

In the completed structure, brace 27 with adjoining section 21 represents a continuous frame member transferring stresses directly from front wheel supporting region into cowl 16 and post 13.

Brace 27 together with wheel housing 29 and cover plate 34 presents a closed box-section which is used as air duct. Air is admitted to this duct through scoop or funnel 36 connected to front end of brace 27 and to inside of wheel housing 29. Funnel 36 extends through or adjoins the margins of opening 37 in baffle plate 38, and its interior communicates with the interior of brace 27 through openings 39 provided in the top wall of brace 27 near the front end thereof.

Openings 24, 33 present one air outlet. A resilient gasket 40 seals the space between brace 27 and section 21 around openings 24, 33.

Figure 5:
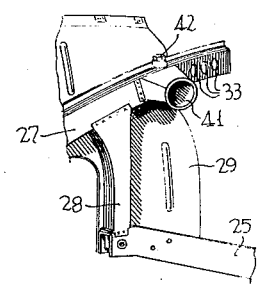
Figure 5 is an inside fragmentary view of the rear end parts of brace and sill members and of the wheel housing, showing an additional air outlet.

A further air outlet 41 may be provided, as shown in Figure 5, near the rear end of brace 27 in front of the openings 33. An adjustable valve, indicated at 42, may serve for directing the air or part of it to the outlet openings 33, or to the outlet 41. The outlet 41 may be connected with heating or air-conditioning devices (not shown).

It is repeated that, while one side only of the body is shown, both sides are equipped with the illustrated brace structure, and both braces may be formed as air conduits.

The new construction has the advantage of great simplicity because one structure serves the dual purpose of structural brace and air conduit. It has the further advantage that no additional space is required for the air conduit. This last-named feature is sometimes of considerable importance because the space available for the motor and its accessories is often rather limited anyhow and would be still more limited if an air conduit would have to be provided in addition to and on the outside of the reinforcing braces.

The invention is not restricted to the details and to the specific type of body construction illustrated in the drawing but is susceptible to modifications. The invention may, for instance, be used at the rear end of a body.

What is claimed is:

1. In an automobile body, a compartment for occupants, an elongated, slender, inclined brace forming a stress-transmitting structural element between an upright wall structure at an end of said compartment and an underframe member and extending longitudinally beyond said compartment, said brace being formed as a closed box-section, an air intake, communicating with the outside air, provided on said section near its end adjoining said underframe member and an air discharge near the other end communicating with the interior of said compartment.

2. In an automobile body, a compartment for occupants, an elongated brace forming a stress-transmitting structural element of the body and extending longitudinally beyond said compartment, said brace being formed as a closed box-section and overlappingly secured to the outer surface of a side wall portion of said body, an air intake provided on said section near one of its ends, said air intake having substantially the cross sectional area of said brace and air outlets communicating with the interior of said compartment being formed by registering openings in adjacent regions of the inner wall of said box-section and of said side wall portion.

3. In an automobile body, a compartment for occupants, a brace forming a stress-transmitting structural element of the body and extending longitudinally beyond said compartment, said brace being formed as a closed box-section, an air intake provided on said section near one of its ends and an air discharge near the other end communicating with the interior of said compartment, said brace being overlappingly secured to the outer surface of a side wall portion of said body, said air discharge being formed by registering openings in adjacent regions of the inner wall of said box-section and of said side wall portion, and sealing means surrounding said openings and inserted between the inner wall of said box-section and said side wall portion.

4. In an automobile body, a compartment for occupants, an elongated brace forming a stress-transmitting structural element of the body and extending longitudinally beyond said compartment, said brace being formed as a closed box-section beam and connecting an upright wall structure of said compartment with an underframe structure projecting longitudinally beyond said compartment, an air intake communicating with the outside air, provided on said box-section near though separated from its end adjoining said underframe structure and a first air discharge near the other end communicating directly with the interior of said compartment, and a second air discharge provided on said box-section between said air intake and said first air discharge, said second air discharge being designed for connecting the interior of said box-section to air-conditioning means such as a heater.

5. In a motor vehicle body construction, a transversely extending cowl structure, a pair of longitudinally extending sill members supporting said cowl structure and extending forwardly therefrom, said sill members being laterally spaced on opposite sides of the longitudinal center line of the vehicle body, a pair of sheet metal side panels defining the outer sides of an engine compartment and the inner sides of wheelhouses, said side panels being inclined downwardly and inwardly toward said longitudinal center line and having their rearward and lower edges conforming and secured to said cowl structure and sill members respectively, and a pair of reinforcing members of hollow cross section each having an upper leg, an inner web and a lower leg, said upper leg being secured at its marginal edge to the inner side of one of said side panels, said inner web bridging the space between said cowl structure and the extended portion of one of said sill members and secured at its marginal edges thereto, said lower leg being secured at its edges to said side panel and adjoining the intermediate portion of the marginal edge of said inner web of the reinforcing members, said reinforcing members, sill members, side panels and cowl structure mutually bracing each other to form a unitary body structure and cooperating with each other to form enclosed ducts at opposite sides of the vehicle body for the transmission of heating and ventilating air from the front portion of the vehicle body to said cowl structure, and said cowl structure having a pair of openings formed therein in alignment with said ducts, the reinforcing member at least on one side of said vehicle body being formed with an opening in its upper leg at the forward portion thereof.

6. In a motor vehicle body construction, a transversely extending cowl structure, a pair of longitudinally extending sill members supporting said cowl structure and extending forwardly therefrom, said sill members being laterally spaced on opposite sides of the longitudinal center line of the vehicle body, a pair of sheet metal side panels defining the outer sides of an engine compartment and the inner sides of wheelhouses, said side panels being inclined downwardly and inwardly toward said longitudinal center line and having their rearward and lower edges conforming and secured to said cowl structure and sill members respectively, and a pair of reinforcing members of hollow cross section each having an upper leg, an inner web and a lower leg, said upper leg being secured at its marginal edge to the inner side of one of said side panels, said inner web bridging the space between said cowl structure and the extended portion of one of said sill members and secured at its marginal edges thereto, said lower leg being secured at its edges to said side panel and adjoining the intermediate portion of the marginal edge of said inner web of the reinforcing members, said reinforcing members, sill members, side panels and cowl structure mutually bracing each other to form a unitary body structure and cooperating with each other to form enclosed ducts at opposite sides of the vehicle body for the transmission of heating and ventilating air from the front portion of the vehicle body to said cowl structure, and said cowl structure having a pair of openings formed therein in alignment with said ducts, the reinforcing member at least on one side of said vehicle body being formed with an opening in its upper leg at the forward portion thereof, and the adjacent inclined side panel being provided with a vertically extending member at its forward end cooperating with said reinforcing member to form therewith an enlarged box section.

7. In a motor vehicle body construction, a transversely extending cowl structure, a pair of longitudinally extending sill members supporting said cowl structure and extending forwardly therefrom, said sill members being laterally spaced on opposite sides of the longitudinal center line of the vehicle body, a pair of sheet metal side panels defining the outer sides of an engine compartment and the inner sides of wheelhouses, said side panels being inclined downwardly and inwardly toward said longitudinal center line and having their rearward and lower edges conforming and secured to said cowl structure and sill members respectively, and a pair of reinforcing members of hollow cross section each having an upper leg, an inner web and a lower leg, said upper leg being secured at its marginal edge to the inner side of one of said side panels, said inner web bridging the space between said cowl structure and the extended portion of one of said sill members and secured at its marginal edges thereto, said lower leg being secured at its edges to said side panel and adjoining the intermediate portion of the marginal edge of said inner web of the reinforcing members, said reinforcing members, sill members, side panels and cowl structure mutually bracing each other to form a unitary body structure and cooperating with each other to form enclosed ducts at opposite sides of the vehicle body for the transmission of heating and ventilating air from the front portion of the vehicle body to said cowl structure, and said cowl structure having a pair of openings formed therein in alignment with said ducts, the reinforcing member at least on one side of said vehicle body being formed with an opening in its upper leg at the forward portion thereof for the entry therethrough of heating and ventilating air, and the adjacent inclined side panel being provided with a vertically extending member at its forward end cooperating with said reinforcing member to form therewith an enlarged box section scoop for receiving the heating and ventilating air.

8. In a motor vehicle body construction, a transversely extending cowl structure, a pair of longitudinally extending sill members supporting said cowl structure and extending forwardly therefrom, said sill members being laterally spaced on opposite sides of the longitudinal center line of the vehicle body, a pair of sheet metal side panels defining the outer sides of an engine compartment and the inner sides of wheelhouses, said side panels being inclined downwardly and inwardly toward said longitudinal center line and having their rearward and lower edges conforming and secured to said cowl structure and sill members respectively, and a pair of reinforcing members of hollow cross section each having an upper leg, an inner web and a lower leg, said upper leg being secured at its marginal edge to the inner side of one of said side panels, said inner web bridging the space between said cowl structure and the extended portion of one of said sill members and secured at its marginal edges thereto, said lower leg being secured at its edges to said side panel and adjoining the intermediate portion of the marginal edge of said inner web of the reinforcing members, said reinforcing members, sill members, side panels and cowl structure mutually bracing each other to form a unitary body structure and cooperating with each other to form enclosed ducts at opposite sides of the vehicle body for the transmission of heating and ventilating air from the front portion of the vehicle body to said cowl structure, the side panel on at least one side of said vehicle body being connected with an air scoop mounted upon the top of the adjacent reinforcing member.

References Cited in the file of this patent

UNITED STATES PATENTS

| Number | Name | Date |
|---|---|---|
| 1,974,033 | Nallinger | Sept. 18, 1934 |
| 2,216,670 | Klavik | Oct. 1, 1940 |
| 2,295,750 | Norris et al. | Sept. 15, 1942 |
| 2,333,818 | Raney | Nov. 9, 1943 |
| 2,388,419 | Komenda | Nov. 6, 1945 |